United States Patent [19]
Williams

[11] Patent Number: 4,878,880
[45] Date of Patent: Nov. 7, 1989

[54] CLUTCH APPARATUS

[75] Inventor: Jack L. Williams, Orange, Calif.

[73] Assignee: ITT Corporation, New York, N.Y.

[21] Appl. No.: 274,637

[22] Filed: Nov. 16, 1988

Related U.S. Application Data

[63] Continuation of Ser. No. 87,579, Aug. 20, 1987, abandoned.

[51] Int. Cl.$^4$ ............................................... F16D 7/04
[52] U.S. Cl. .......................................... 464/37; 464/85
[58] Field of Search ........................ 464/30, 37, 81, 82, 464/83, 87, 85

[56] References Cited

U.S. PATENT DOCUMENTS

| | | | |
|---|---|---|---|
| 1,092,574 | 4/1914 | Jansson | 464/37 |
| 2,441,038 | 5/1948 | Siesel | 464/37 |
| 2,773,370 | 12/1956 | Intraub et al. | 464/37 |
| 3,724,815 | 4/1973 | Hawkins et al. | 464/37 X |
| 3,877,259 | 4/1975 | Bishop | 464/37 |
| 3,932,956 | 1/1976 | Young | 46/202 |
| 4,006,787 | 2/1977 | Rumpp et al. | 464/37 X |
| 4,572,041 | 2/1986 | Rissmann | 464/37 X |

FOREIGN PATENT DOCUMENTS

| | | | |
|---|---|---|---|
| 532026 | 10/1956 | Canada | 464/37 |
| 1163613 | 9/1958 | France . | |
| 661643 | 11/1951 | United Kingdom | 464/37 |
| 2022199 | 12/1979 | United Kingdom | 464/37 |

Primary Examiner—Daniel P. Stodola
Attorney, Agent, or Firm—Menotti J. Lombardi

[57] ABSTRACT

Clutch apparatus having a rotary inner member with axially extending flexible members that engage complimentary cavities in an outer rotary member. When a predetermined value of torque is exceeded, the flexible members slip in the cavities of the outer member.

3 Claims, 5 Drawing Sheets

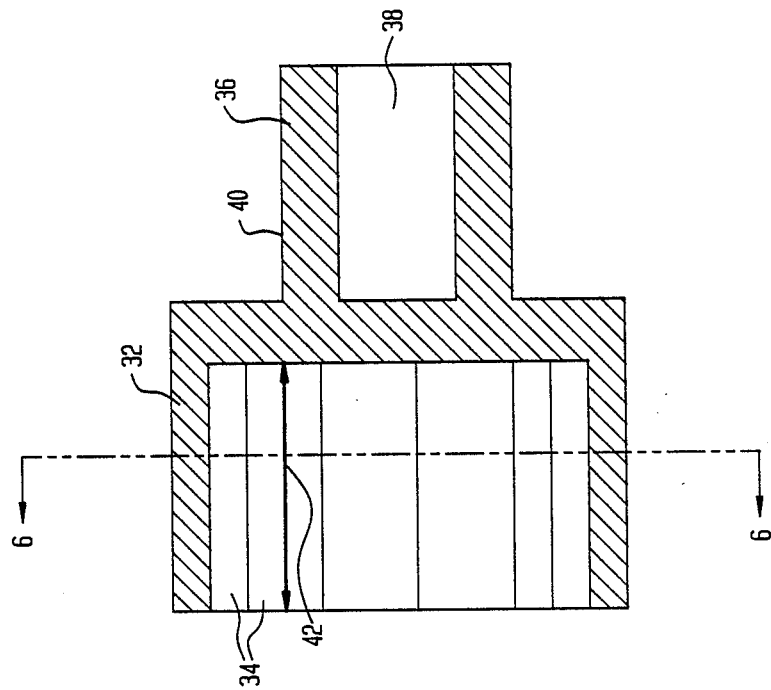
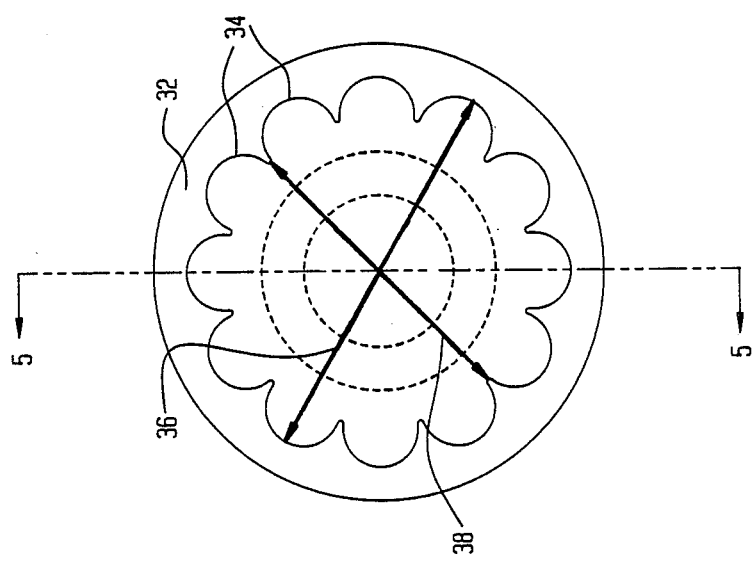
FIG. 5
FIG. 4

CLUTCH APPARATUS

This application is a continuation of application Ser. No. 087,579, filed 08/20/87, now abandoned.

BACKGROUND OF THE INVENTION

This invention relates to clutch apparatus, and more particularly to an improved slip or safety clutch.

Most devices of the prior art which perform a similar function to this invention are relatively expensive and require several fabricated parts. Some of these are known as spring loaded clutches or spring loaded clutch couplings. These rely on the pressure of a spring device to maintain force and thus friction between two rotating surfaces. When the value of the design torque is exceeded in operation, the device slips in rotation to protect a mechanism from damage.

The prior art devices, in addition to being complex and expensive for the function performed, rely on the friction between two surfaces to provide slip resistance. The slip resistance value will vary from part to part and from time to time depending on a number of design variables. Further, it is more difficult and expensive to provide for corrosion resistance in these devices when compared to the clutch apparatus of the invention.

Devices are also known which utilize radial deformable members made of rubber, rubber composition, or rubber and fabric composition. These members deform and provide a scraping action resulting in excessive wear of the members and a substantial amount of radial movement. The torque and life capability of such rubber or rubber fabric type composite members is limited.

In order to overcome the foregoing problems and limitations, an improved slip or safety clutch is hereinafter described.

SUMMARY OF THE INVENTION

Accordingly, it is an object of the present invention to provide clutch apparatus wherein the resistance to rotation is provided by flexible finger or beam members.

Another objective of the invention is to provide a two piece clutch arrangement wherein one piece has flexible finger or beam members and the other piece has cavities or recesses which engage the flexible members, so that when the designed torque is exceeded, the flexible members will slip in the cavities.

An additional object of the invention is to provide clutch apparatus having a rotary inner member with a plurality of flexible beam members, and a rotary outer member with a plurality of cavities which are in coupled engagement with the beam members for rotations, and when a predetermined torque value is exceeded, the beam members slip in the cavities of the outer member.

There are many features and advantages in using the clutch apparatus of the invention. For example, the two pieces of the clutch can be molded or fabricated out of corrosion resistant material. The two piece clutch can also be formed as a part of rotating mechanism and aligned along the center of rotation. If a safe or designed torque is exceeded, this clutch apparatus allows a controlled slippage between sections of the rotating mechanism. This clutch maintains the designed resistance to rotation before, during and after slippage takes place.

The improved apparatus of the invention can be used wherever a slip or safety clutch is now used, and in some applications, where known safety or slip clutches cannot now be used.

BRIEF DESCRIPTION OF THE DRAWINGS

Other objects, features and advantages of the present invention will become more fully apparent from the following detailed description of the preferred embodiments, the appended claims and the accompanying drawings in which:

FIG. 4 is an end view of the outer member of the clutch apparatus of the invention;

FIG. 5 is a cross-sectional view of FIG. 4 taken along lines 5—5;

DETAILED DESCRIPTION OF THE PREFERRED EMBODIMENTS

Figure 1:
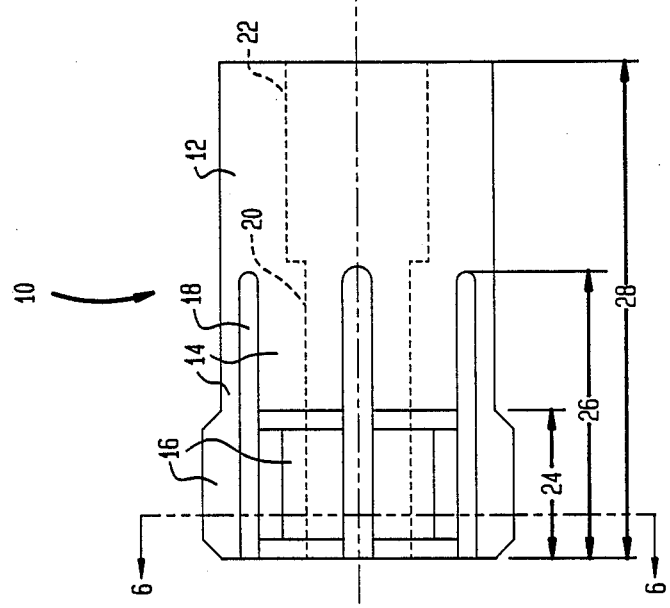
FIG. 1 is a side view of inner member of the clutch apparatus with flexures according to the invention.

With specific reference to FIG. 1, there is shown a male or rotary inner member 10, having a generally cylindrical hub portion 12, and flexible finger shaped or beam members 14. The members 14 have radially extending tooth projections 16. The members 14 are uniformly shaped and separated by equal interdigital spaces 18. The cylindrical inner diameter 20 of the members 14 extends to the hub portion 12. Hub portion 12 has a larger inner diameter 22 for mounting on a drive shaft. The mounting to the shaft may be accomplished by known methods such as using a key, spline, or square coupling. The hub 12 may also be provided with an extension or made integral with a driving gear or shaft.

In one example of the embodiment, the length 24 of the tooth projection 16 and the length 26 of beam member 14 had a size ratio of 1:2; and the length 26 had a size ratio of 2:3 to the overall length 28.

Figure 2:
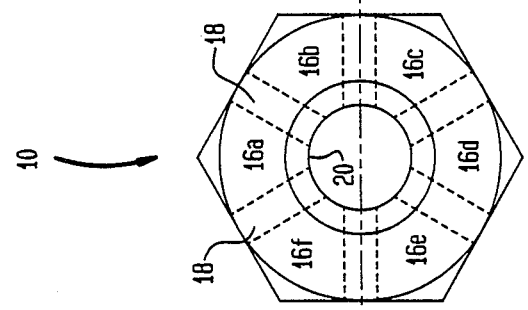
FIG. 2 is a left end view of FIG. 1.

Referring now to FIG. 2, a left end view of member 10 is shown. The tooth projections 16 form six repetitive sections of an array 16a - 16f. The six sections of the array have a generally pentagonal shape, but could be formed round, triangular, etc. The overall shape as viewed in FIG. 2 is hexagonal. This could also change depending on the number of beam members and shape of the tooth projections.

The interdigital space 18 and the inner diameter 20 permit inward radial deflection of beam members 14 at the load design point.

Figure 3:
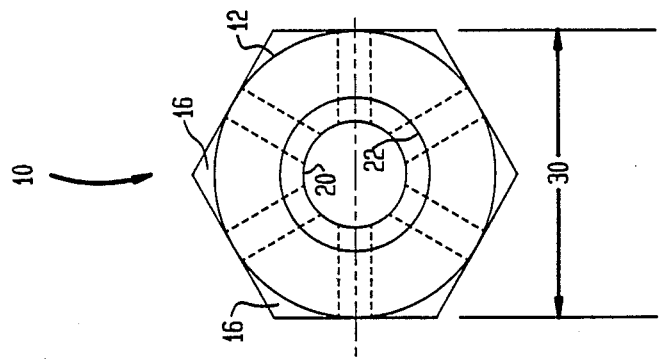
FIG. 3 is a right end view of FIG. 1.

FIG. 3 is a right end view of member 10 shown in FIG. 1. There is illustrated inner diameters 20, 22, hub portion 12, and tooth projections 16. In the example of the embodiment previously referenced in connection with FIG. 1, outer diameter 30 of hub 12 had a size ratio of 1:2 to the inner diameter 20.

Referring now to FIG. 4, there is shown a female, or rotary outer member 32 having twelve cavities, recesses, or detents 34 which are complementary and engage the tooth projections as herein after shown. The maximum diameter 36 of a cavity 34 is always less than the maximum outer diameter of the tooth projections 16. The minimum inner diameter 38 must relate to the amount of desired beam member deflection (preload condition), as assembled.

In FIG. 5, a cross-sectional view of the outer member 32 taken along line 5—5 of FIG. 4. The outer member 32 has a mounting hub portion 36 for mounting a shaft in cylindrical cavity 38, or a gear on surface 40 of hub 36. The shaft or gear to be driven may be mounted in several known ways, or the member 32 may be made integral with the driven shaft or gear or structure. The length 42 of cavities 34 must extend at least a length 24 equal to tooth projection length 16.

Figure 6A:
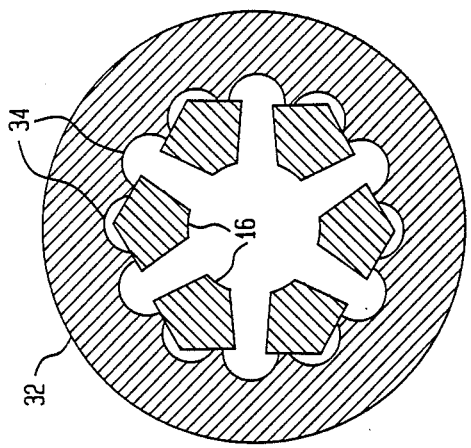
FIGS. 6a–d show in a cross-sectional view the engagement of the inner and outer members as taken along lines 6—6 in FIGS. 1 and 5 in different materials.

FIG. 6a shows in a combination cross-sectional view the engagement of the inner member tooth projections 16 with outer member cavities 34, both members being made of methl. The combination cross-sectional view was taken along lines 6—6 of FIGS. 1 and 5. The six tooth projections 16 engage alternate cavities 34. The rotary inner member 10 through the tooth projections 16 drive the outer member 32 until the load on the outer member 32 is increased or the outer member 32 movement locked or prevented. Thereupon, the flexible finger shaped or beam members will flex inwardly toward the center and the tooth projections will shift or slip to the next adjacent cavity. This slippage will continue without damage to the outer or inner members until the overload condition is removed from the outer member or the drive power through the inner member is stopped. This simple but effective slipping clutch apparatus will thus protect the connecting drive and output mechanisms.

Figure 6D:
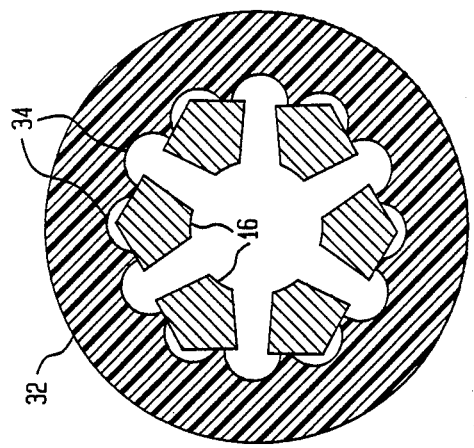
Figure 6C:
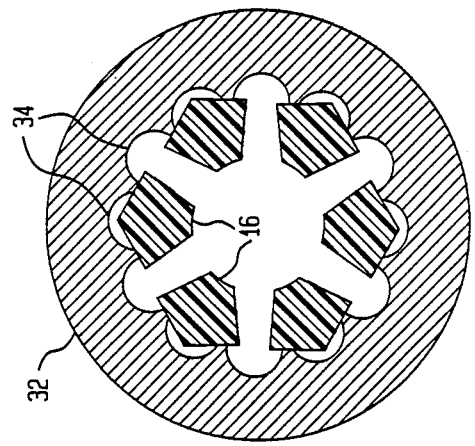
Figure 6B:
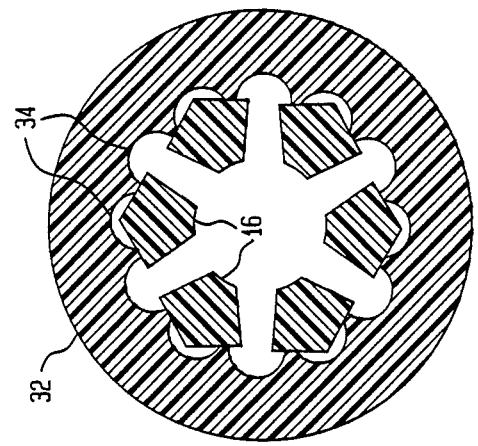

In FIG. 6b both members are made of plastic; in FIG. 6c the outer member is metal and the inner member is plastic; and in FIG. 6d, the outer member is plastic and the inner member is metal.

In order to appreciate the application size and material possibilities of the invention, and using the ratios discussed, a member 10 having approximately a length 28 of 0.75 inches, a length 26 of 0.50 inches, a length 24 of 0.25 inches, a diameter 30 of 0.50 inches, and a diameter 20 of 0.25 inches was fabricated from an acetal plastic. The outer member 32 having approximately an outer diameter of 0.75 inches, a length 42 of 0.375 inches, and the maximum cavity diameter of 0.565 inches was fabricated from an acetal plastic. With the size and material described, the clutch apparatus will provide 5 to 10 inch ounces of torque.

If a similar size male and female member is fabricated with steel, the resulting apparatus will produce 20 to 30 times greater torque. If one member is made of steel and one of plastic, the resulting torque will be less than an all steel combination and greater than an all plastic combination. It has also been discovered that the torque capability can be controlled by the stiffness of the beam members 14.

An advantage of this apparatus is that it can be made inexpensively by molding from a plastic material. Such a configuration would be corrosion resistant and could be used in a corrosive environment. Of course, the parts could be made from a suitable stainless steel or other metal alloy and provide corrosive resistance.

Figure 7:
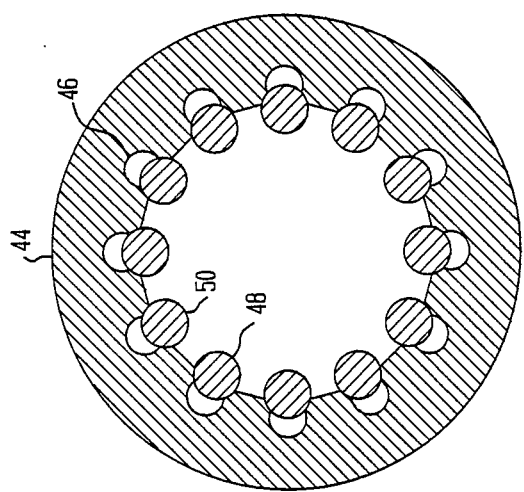
FIG. 7 shows a cross-sectional view of the inner and outer members in a different complementary configuration from that shown in FIG. 6.

Referring now to FIG. 7, another type configured outer member 44 is shown having deeper cavities, recesses or detents 46. In this configuration, the complementary tooth projections 48 have a rounded tooth engaging area 50 to correspond to the deeper cavities 46.

It should be understood by those skilled in the art that while I have shown and described six flexible finger members and twelve cavities in a one to two correspondence of inner to outer members, this invention can be practiced using a 1:1, 1:3, 1:4, etc., depending on the design requirements. It should also be evident that the flexible finger or beam members can be made with two or more elements depending on the design requirements. An even number is not required, but has been used to facilitate machining of the inner members. In a molded part, this would not be a problem and an odd number of flexible finger members could be utilized The outer member would then have the appropriate correspondence of cavities as hereinbefore described.

It is further contemplated and should be apparent to those skilled in the art, that the outer member could be configured with the flexible finger beam members and the inner member configured with the cavity or detents on its outer surface.

Figure 8:
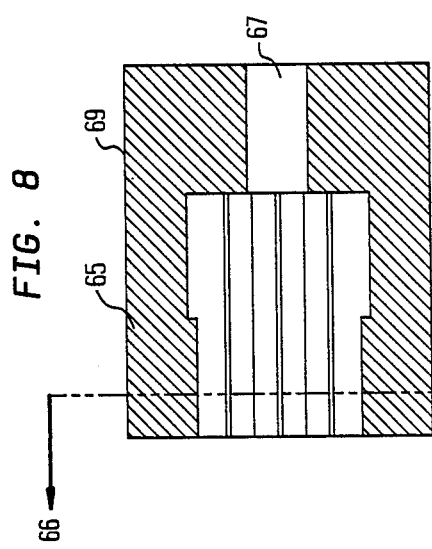
FIG. 8 shows a cross sectional view of a member having the flexible fingers on the outer or female portion of the clutch assembly.

Referring now to FIG. 8, an outer member 69 is shown having flexible fingers 65 that flex outwardly when the design torque is exceeded. The slots 68 between the fingers allow individual movement of the fingers. A hole 67 is provided in the hub portion of the member to facilitate attachment to a shaft or other rotating member. The hole 67 can be of any size and shape to accommodate application or design needs. The hub portion of 69 could also be integral with a rotating member of a mechanism.

Figure 9:
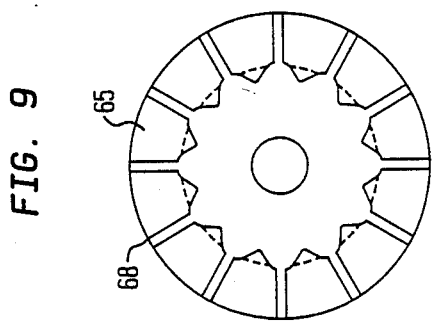
FIG. 9 is an end view of FIG. 8.

FIG. 9 shows an end view of the member in FIG. 8. The shapes, dimensions and number of fingers 65 are intended to represent general types and these parameters would normally be chosen to accommodate particular design needs. The slots 68, between the fingers flexing outwardly, can be much narrower in this configuration than in the configuration where the fingers flex inwardly.

Figure 10:
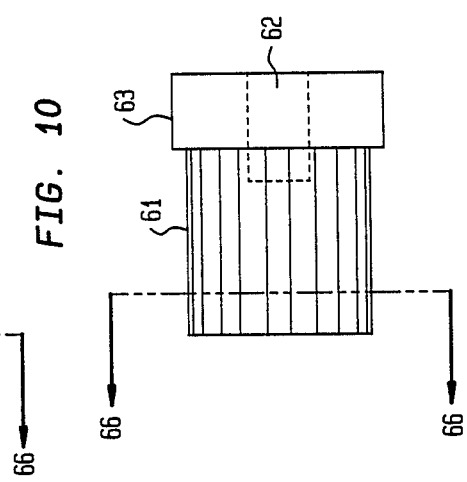
FIG. 10 is a side view of an inner or male member having cavities that would interact with the fingers on the member shown in FIG. 8.
Figure 11:
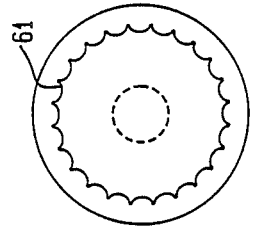
FIG. 11 is an end view of FIG. 10.

Referring now to FIG. 10, a side view is shown of an inner male member 63 that corresponds to the female, outer member shown in FIGS. 8 and 9. The diameter of the hub portion of the member 63, is shown larger than the diameter of the cavity portion. This is arbitrary and actual designs could embody a hub portion that has a smaller diameter than the cavity portion or, the hub portion could be omitted. A hole 62 is shown as a possible means of attaching the member 63 to a shaft or other rotating element of a mechanism. The hole 62 can be of any size or shape to accommodate particular designs. The hole 62 could be omitted and the cavity portion 61 could be formed integrally with a rotating element of a mechanism. A boss or protrusion could also serve the function of attachment to a shaft or rotating member. FIG. 11 is an end view of FIG. 10.

Figure 12:
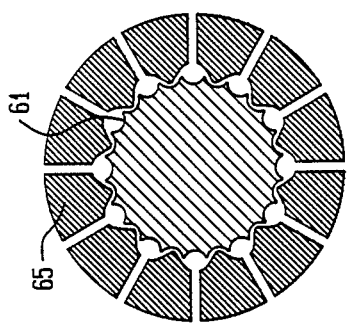
FIG. 12 is a cross sectional view of the male part shown in FIG. 10 assembled to the female part shown in FIG. 8; the section is in the plane indicated by the arrows 66.

Referring to FIG. 12, a cross sectional view is shown, generally through a plane shown by the arrows 66 in FIGS. 8 and 10. This cross section illustrates the engagement of the fingers 65 of member 69 with the cavities 61 of member 63. The assembly would rotate as a force transmitting section of a shaft or assembly until a design torque was exceeded. When the design torque is exceeded, the fingers 65 flex outwardly and the outer member 69 rotates (slips) with respect to the inner member 63. The fingers 65 snap into the next cavities in the inner member 63, in the direction of rotation without damage to the mechanism. This action would be repeated in a ratchetting manner until the excessive torque was reduced to a value within the design limits. This action would be the same in either direction of the rotation in the example shown but the shape of the members could be designed so that the maximum torque design point in one direction of rotation was different than the maximum torque design point in the other direction.

While the present invention has been disclosed in connection with the preferred embodiments thereof, it should be understood that there may be other embodiments which fall within the spirit and scope of the invention as defined by the following claims.

I claim:

1. A two piece slip clutch, each piece being molded in plastic and having a unitary configuration, the clutch comprising:

an inner rotary member including a cylindrical hub portion having an inner hub diameter and an outer hub diameter, a plurality of beam members axially extending from said hub portion, said beam members being uniformly shaped and separated by equal interdigital spaces, and said beam members having tooth projections and a cylindrical inner diameter which is smaller than said inner hub diameter;

a cylindrically shaped rotary outer member having a plurality of cavities on the inner peripheral surface at least equal said beam members and a hub mounting portion, said cavities being formed for coupling engagement with said tooth projections, the maximum diameter of a pair of oppositely located cavities is less than the maximum outer diameter of a pair of oppositely located tooth projections, and when the outer member is subjected to an overload condition, said beam members flex inwardly toward the center and the tooth projections slip to the next adjacent cavity.

2. The clutch of claim 1, wherein said beam members have a length with a size ratio of 2:3 to the overall length of the inner member; each of said tooth projections has a length with a size ratio of 1:2 to the length of a beam member; and said outer hub diameter has a ratio of 1:2 to said inner cylindrical diameter.

3. The clutch of claim 1, wherein said inner member has six axially extending beam members and said outer member has twelve equally spaced cavities around the interior peripheral surface, and said six beam members being equally spaced to engage alternate ones of said twelve cavities.

* * * * *